Sept. 13, 1932.  C. A. NORGREN  1,877,528
VALVE
Filed April 16, 1928
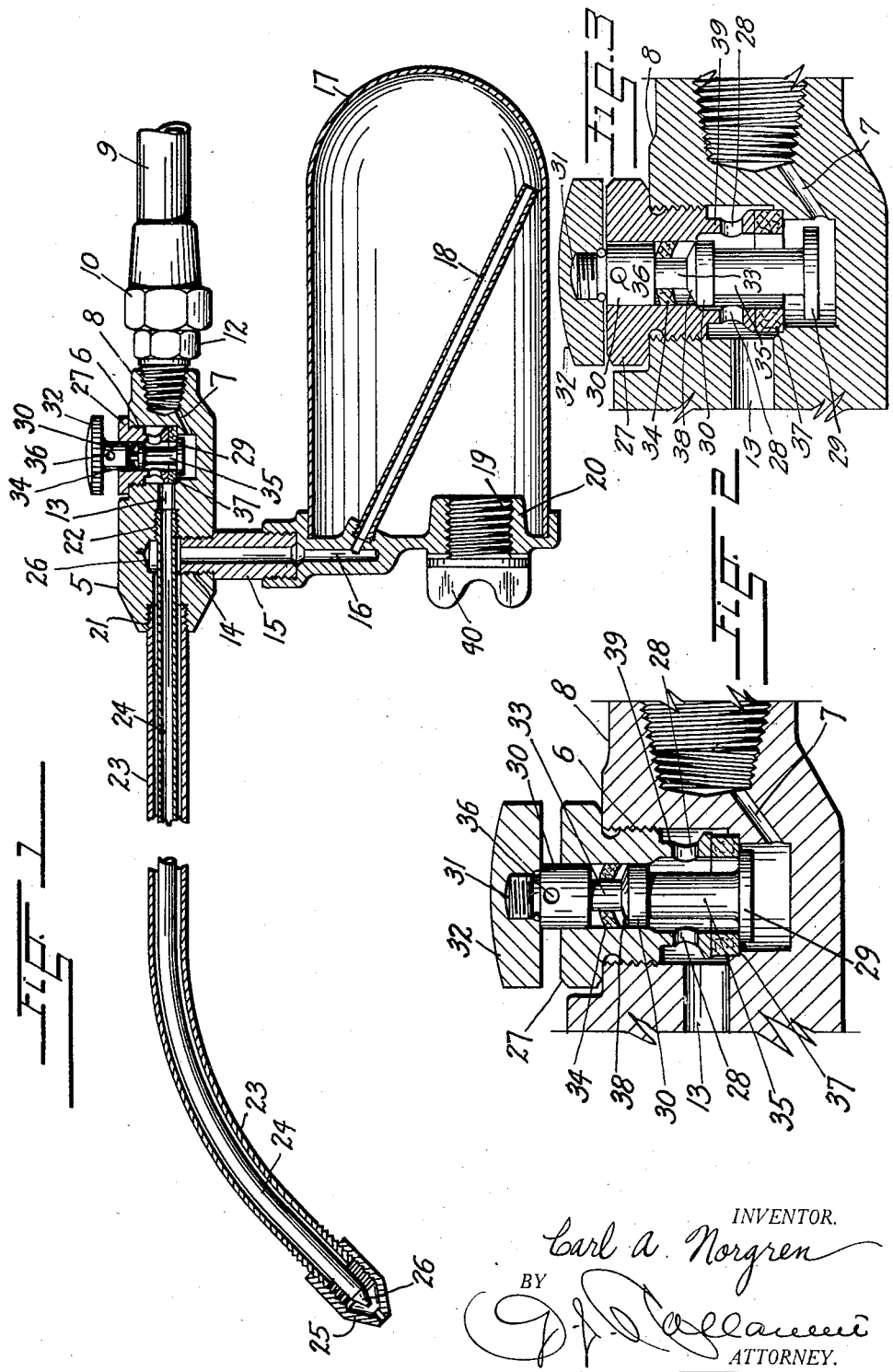
INVENTOR.
Carl A. Norgren
BY
ATTORNEY.

Patented Sept. 13, 1932

1,877,528

UNITED STATES PATENT OFFICE

CARL A. NORGREN, OF DENVER, COLORADO

VALVE

Application filed April 16, 1928. Serial No. 270,399.

This invention relates to improvements in air guns of the type disclosed in my application for patent Serial No. 178,653, filed March 26, 1927, of which the present application is a continuation as to features common to both applications.

The invention hereinafter to be described in detail relates particularly to the construction of the valve by which the admission of air under pressure, used in the operation of the gun, is controlled at the will of the operator.

It is an object of the invention to provide a valve of this type which is simple in construction, practical and efficient in operation.

Another object of the present invention is to provide a valve assembly that may be inserted as a unit in any device using fluid pressure.

A further object is to provide means in such a valve to prevent leakage while in use and when not in use.

Still other objects reside in details of construction and in novel combinations and arrangements of parts. In the drawing, in which like reference characters represent similar parts in the two views, Figure 1 is a sectional elevation of an air gun of which the present valve is an element;

Figure 2 is a sectional elevation of the valve, drawn to an enlarged scale; and

Figure 3 is a broken, sectional elevation, showing another position of the valve, drawn to the same scale as Figure 2.

Referring more particularly to the drawing, the reference numeral 5 represents the body of a gun, in which the present valve is used as will be more fully explained hereinafter.

The body 5 has a threaded valve chamber 6 connected by a duct 7 with a screw-threaded socket 8 at an end of the body. A conduit 9, connected with a suitable source of air supply, is fastened to the body by a coupling 10 having a nipple 12 in the screw-threaded socket.

An axial bore 13, at the opposite end of the body, likewise connects with the valve chamber 6. A passage 14 in the body, transverse to the bore, is screw-threaded for the application of a short tube 15 that connects the bore 26 with a passage 16 in an oil reservoir 17. A tube 18, extending diagonally through the reservoir, feeds oil from the reservoir to the passage 16.

The reservoir has a filler opening 19 and an internal boss 20 surrounding same.

The bore of the body has screw-threaded shoulders 21 and 22 of different diameters. Co-axial, spaced pipes 23 and 24 are screwed into said shoulders respectively. The inner pipe 24 connects the bore 13 with a nozzle at an end of the pipes and the space between the pipes is connected with the tube 15 by an enlarged portion 26 of the bore.

The nozzle consists of an apertured cap 25 screwed on the end of the outer pipe 23 around a jet tip 26 screwed on the inner pipe 24. The cap 25 is normally spaced from the tip to provide a passage for the discharge of the oil, but it can be screwed into engagement with the tip to seal the device when not in use.

Mounted in the chamber 6 is a valve which controls the passage of air from the conduit 9 to the inner pipe 24.

The valve has a threaded cage 27 screwed into the valve chamber into engagement with a washer or gasket 37 of soft material placed against a shoulder at the inner end of the chamber to provide a resilient valve seat.

The case has ports 28 and a circumferential groove 39 for the passage of air from its interior to the bore 13. The valve proper consists of a flat disc 29 on an end of a valve stem 30 mounted to slide in the cage 27. The end of the stem opposite to that which carries the disc, protrudes from the cage and has a screw-threaded connection 31 with a head or button 32.

The valve stem is peripherally grooved as at 33, to provide a space for a flexible sealing washer or diaphragm 34, which is slightly larger in diameter than the cage bore and contacts with the wall thereof to prevent air from leaking past the valve stem when the button is depressed to separate the valve from its seat. The grooved portion of the stem 30 is movable through the washer 34, as indicated by the relative positions of the groove and washer in Figures 2 and 3. Figure 2 shows the valve in a closed position, and Figure 3 shows same in an open position. The stem 30 also has a tapered shoulder 38 adjacent the groove 33, which assists in maintaining the sealing washer in the cup shape shown in the drawing. The stem is also peripherally grooved as at 35 to provide a passage between the duct 7 and the ports 28.

A hole 36 in the stem immediately below the button is for the insertion of an awl or other pointed tool, to hold the stem while the button is screwed upon its extremity.

In assembling the valve, the resilient washer is stretched and pulled over the end 31 of the valve stem until it reaches the groove 33, when it contracts to the size shown. The stem is then inserted through the cage bore from the bottom, as shown in Figure 2, until the disc 29 engages the gasket 37. An awl or other instrument is then inserted in the hole 36 to hold the valve stem 30 against rotation. The button 32 is then screwed on the threaded end 31. The valve unit is now ready for application to a spray gun, an air line, or other device.

In the operation of the gun, the fluid pressure in the duct 7 keeps the disc 29 tight against the gasket 37. The sealing washer being larger than the bore, the shoulder 38 holds same in a cup shape.

When the button is depressed, the valve stem causes the sealing washer to press tightly against the wall of the cage bore, thereby sealing the latter against the escape of air around the valve stem.

When the button is released, the fluid pressure from the duct and resilience of the sealing washer cause the valve to seat firmly against the gasket 37.

In operating the gun shown in the drawing, the reservoir is filled with oil poured through the opening 19, which is closed by a cap 40. The body is connected by the bore 8 with a source of air pressure.

By depressing the button 32, as explained, the air pressure passing from the jet 26 creates a partial vacuum inside the cap 25, which draws liquid from the reservoir through the passage 16, tube 15 and the outer pipe 23. An atomizing effect is produced at the nozzle to deliver the oil from the nozzle in a spray.

The discharge at the nozzle is regulated by the position of the cap 25 relative to the air jet. When the gun is not in use, the oil outlet may be sealed by screwing the cap tight on the jet.

The valve of the present invention is not limited in its use to a spray gun of the character described, but may be used in any air line or for the control of other fluid pressure.

What I claim and desire to secure by Letters Patent is:

1. In an air line, an air-controlling valve comprising in combination with a body having a valve chamber and a duct for the ingress of air to the chamber and a duct for the egress of air from the chamber, a valve-cage in the body having a port in connection with the egress-duct, a valve controlling the admission of air from the ingress-duct to the valve-cage, a shouldered stem for the valve movable in the cage and projecting outside the same for its manipulation, and a resilient washer in the cage for engaging a shoulder on the stem.

2. In an air line, an air-controlling valve comprising in combination with a body having a valve chamber and a duct for the ingress of air to the chamber and a duct for the egress of air from the chamber, a valve-cage in the body having a port in connection with the egress-duct, a valve controlling the admission of air from the ingress-duct to the valve-cage, a resilient seat for the valve, a shouldered stem for the valve movable in the cage and projecting outside the same for its manipulation, and a resilient washer in the cage for engaging a shoulder on the stem.

3. In an air line, an air-controlling valve comprising in combination with a body having a valve chamber and a duct for the ingress of air to the chamber and a duct for the egress of air from the chamber, a valve-cage in the body having a port in connection with the egress-duct, a valve controlling the admission of air from the ingress-duct to the valve-cage, a stem for the valve slidably fitted in the cage and projecting outside the same for its manipulation, the stem having a peripheral groove, and a resilient washer in the groove, in engagement with the wall of the cage.

4. In an air line, an air-controlling valve comprising in combination with a body having a valve chamber and a duct for the ingress of air to the chamber and a duct for the egress of air from the chamber, a valve-cage in the body having a port in connection with the egress-duct, a valve controlling the admission of air from the ingress-duct to the valve-cage, a shouldered stem for the valve movable in the cage and projecting outside the same for its manipulation, and a resilient over-size washer in the cage for engaging a shoulder on the stem.

5. In an air line, an air-controlling valve comprising in combination with a body having a valve chamber and a duct for the ingress of air to the chamber and a duct for the egress of air from the chamber, a valve-cage in the body having a port in connection with the egress-duct, a valve controlling the admission of air from the ingress duct to the valve-cage, a shouldered stem for the valve movable in the cage and projecting outside the same for its manipulation, and a washer of larger diameter than the interior of the cage, for engaging a shoulder of the stem within the cage.

6. In an air line, an air-controlling valve comprising in combination with a body having a valve chamber and a duct for the ingress of air to the chamber and a duct for the egress of air from the chamber, a valve-cage in the body having a port in connection with the egress-duct, a valve controlling the admission of air from the ingress-duct to the valve-cage, a stem on the valve slidably fitted in the cage and projecting outside the same for its manipulation, the stem having peripheral grooves, one of which is in register with the port of the cage, and a resilient washer in the other groove of the stem.

7. In an air line, a valve chamber and a valve controlling the passage of air through the line, the valve comprising a shouldered stem and a cup-shaped flexible diaphragm on the stem, engaging the wall of the chamber, the stem being movable through the diaphragm, and the shoulder being disposed to move the diaphragm to a position for tightly engaging the wall of said chamber to seal the chamber against leakage during such movement of the stem.

8. In an air line, a valve chamber, a valve seat and a manually operable valve, disposed to be held against the seat, comprising a stem, a normally cup-shaped, flexible diaphragm on the stem, engaging the wall of the chamber the stem being movable through the diaphragm, and means for moving the diaphragm tight against the wall to seal the chamber against leakage of air when the stem is moved to open the valve.

In testimony whereof I have affixed my signature.

CARL A. NORGREN.